W. C. BRINTON AND W. J. DUDLEY.
BRAKE.
APPLICATION FILED AUG. 26, 1916.

1,360,089.

Patented Nov. 23, 1920.
3 SHEETS—SHEET 1.

INVENTORS
Willard C. Brinton
Watson J. Dudley
BY
ATTORNEY

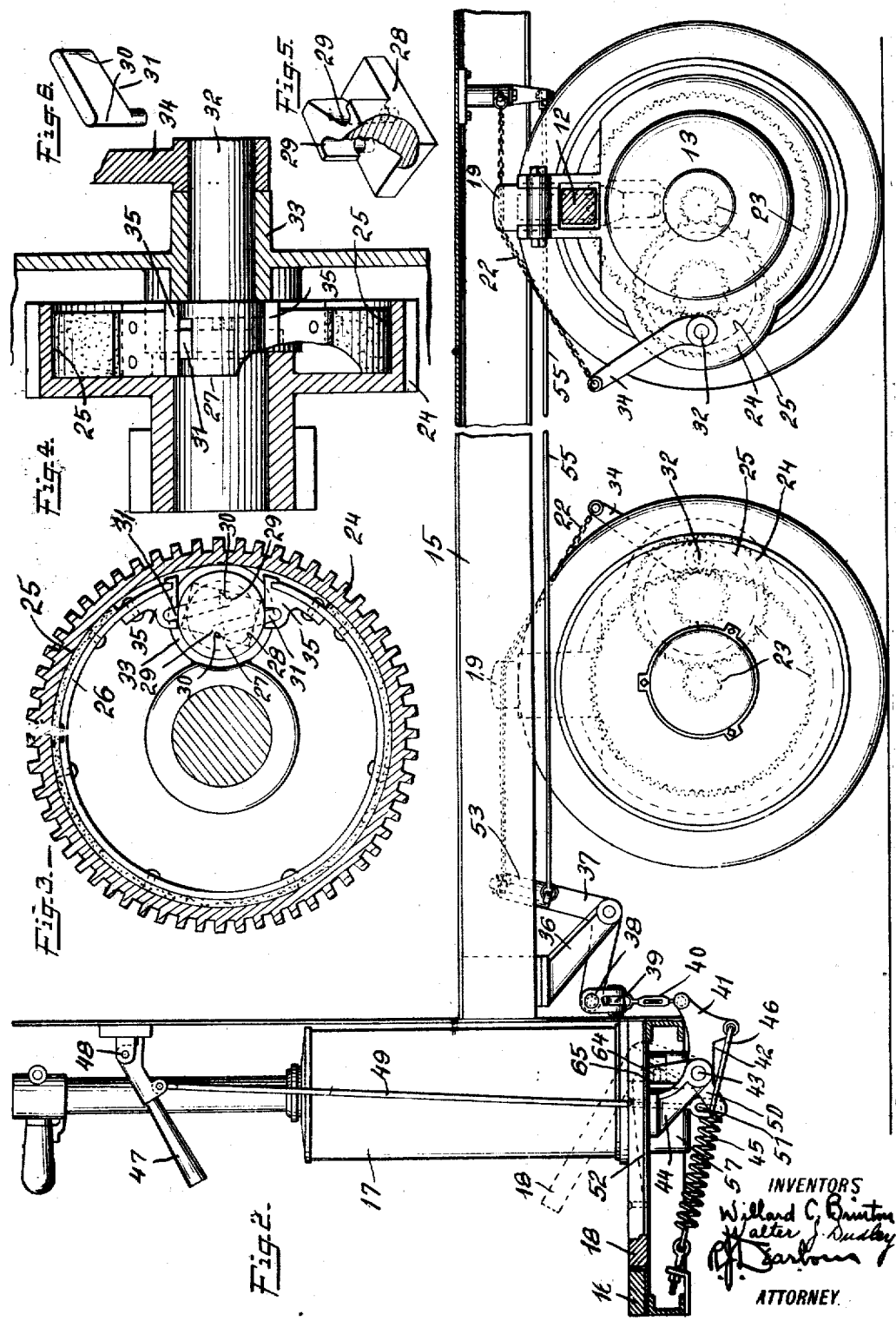

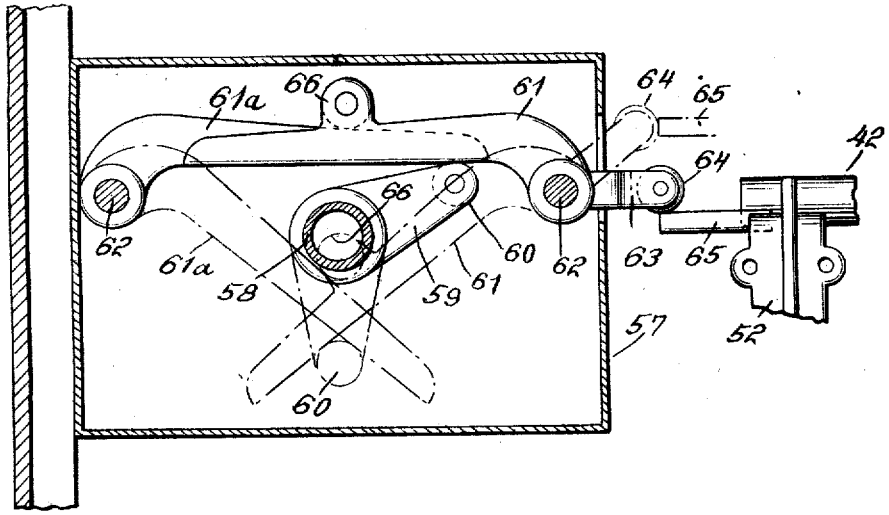
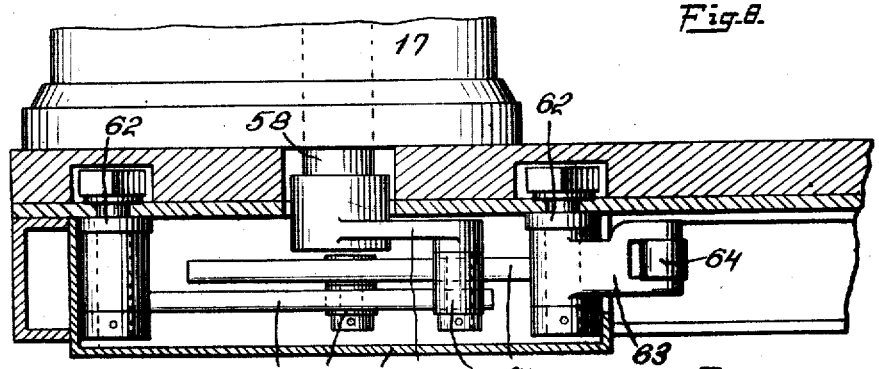
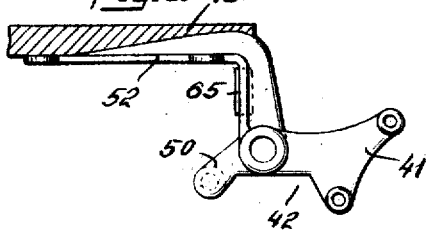
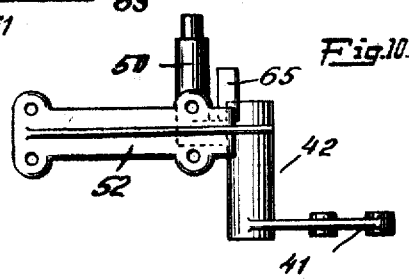

UNITED STATES PATENT OFFICE.

WILLARD C. BRINTON, OF NEW YORK, AND WALTER J. DUDLEY, OF BROOKLYN, NEW YORK; SAID DUDLEY ASSIGNOR TO SAID BRINTON.

BRAKE.

1,360,089.  Specification of Letters Patent.  Patented Nov. 23, 1920.

Application filed August 26, 1916. Serial No. 117,030.

*To all whom it may concern:*

Be it known that we, WILLARD C. BRINTON, a citizen of the United States of America, and a resident of New York, county and State of New York, and WALTER J. DUDLEY, a citizen of the United States of America, and a resident of Brooklyn, Kings county, and State of New York, have invented certain new and useful Improvements in Brakes, of which the following is a specification, reference being had to the accompanying drawings, forming a part thereof.

Our invention relates to brakes and brake-controlling apparatus for vehicles, and has special reference to brakes for vehicles of the class shown and described in a copending application Serial No. 802,192, filed November 21, 1913, by Willard C. Brinton, one of the applicants herein, in which the steered wheels are motor-driven.

One object of our invention is to provide a relatively small and compact brake that shall be particularly effective and easily actuated.

Another object is to provide brake control mechanism comprising means for suitably equalizing the brake pressure as applied to the several wheels of the vehicle.

Still another object is to provide a simple and reliable interlock mechanism for not only preventing the application of driving power to the vehicle wheels when the brakes are set, but also for automatically shutting off the power in case the brake is applied.

Although our invention is not limited to any specific vehicle or apparatus, it is well adapted for use with a four-wheel truck having all of its wheels both motor-driven and steered, and it is a further object of our invention to provide a brake mechanism which may be applied with equal facility when tilted on their steering pivots.

In order that our invention may be thoroughly understood, we will now proceed to describe the same in the following specification, and then point out the novel features thereof in appended claims.

Referring to the drawings:

Fig. 2 is a partially sectional elevation, taken on the line 2—2 of Fig. 1.

Fig. 3 is a sectional detail showing the brake member and its actuating parts, and Fig. 4 is a sectional elevation at right angles to Fig. 3, showing the internal braking drum with which the brake member coöperates.

Figs. 5 and 6 are perspective details of the same mechanism drawn to a larger scale.

Fig. 7 is a plan view of the interlock mechanism between the brake application levers and motor controller for the vehicle.

Fig. 8 is a partially sectional elevation showing the same parts.

Fig. 9 is a detail elevation of the brake release pedal, and

Fig. 10 is a plan view of the same.

Corresponding parts are designated by the same reference characters in all the figures.

Figure 1:
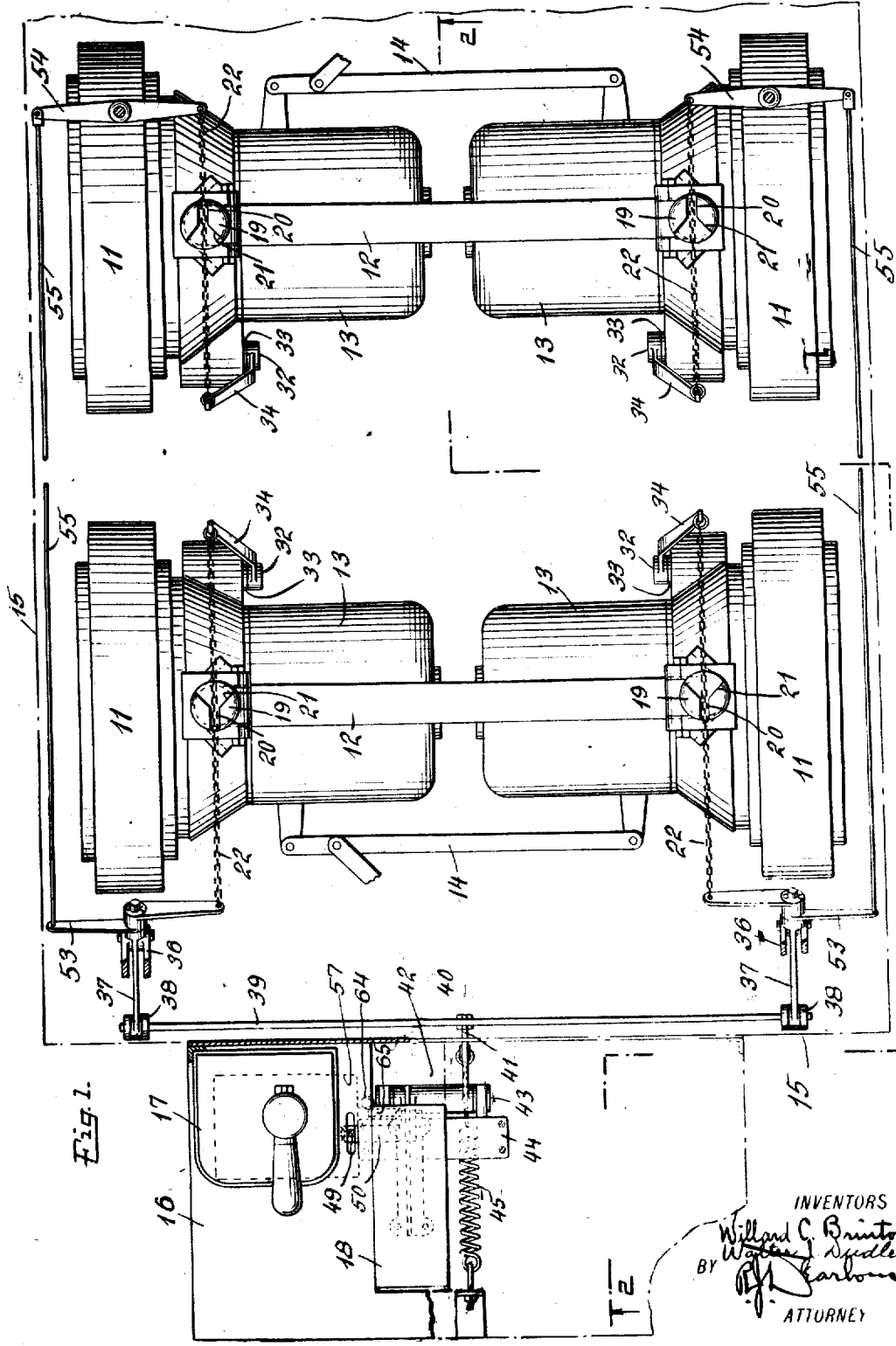
Figure 1 is a plan view with the platform removed, of a vehicle equipped with the brake mechanism of my invention.

In the drawings, 11 designates the vehicle wheels, 12 axle rods to which wheel motors 13 are pivotally connected. The motors are interconnected in pairs by steering links 14. The vehicle frame 15 is shown in broken lines in Fig. 1, and has a step or platform extension 16 on which a motor controller 17 is mounted. There is a movable section to the front platform which constitutes a pedal and is attached to the brake actuating mechanism as shown in Fig. 2.

Each of the motors 13 is provided with a trunnion projection which coöperates with the adjacent end of the axle bar 12, and is connected thereto by a pivot pin 19. The head of these pins are formed with grooves 20 having a longitudinal section and a flared or spreading section designated 21, arranged to act as guides for the brake-actuating chains 22 which form parts of the brake control mechanism.

This mechanism comprises a gear wheel 24 having a hollow cylindrical drum or pocket 25. In this hollow cylindrical drum is placed a brake member or shoe 26 in the form of an interrupted floating expandible ring (see Fig. 3). Extending between or adjacent to the ends of the interrupted brake member or shoe 26 is a rotatable actuating crank shaft 32. This crank shaft has a slot 27 in which a block 28 is slidably mounted. The block 28 has a pair of sockets 29 which are engaged by the curved ends 30 of compression pawls 31. The crank shaft 32 is rotatively mounted in a bearing 33 in the gear casing, the lever 34 being attached to its opposite end.

The arrangement of parts is such that the crank shaft which is relatively stationary constitutes an abutment for one end of the ring or shoe, both of which are provided with heads or enlargements 35, as clearly shown in the drawings. One or the other of the ends of the shoe will be moved into contact with the crank shaft according to the direction of the drum rotation when the brakes are applied, and by reason of the fact that the block 28 is slidably mounted in the slot 27 the opposite end of the brake shoe is free to rotate to a slight extent with the drum as it is crowded into engagement therewith. At the same time the turning of the crank shaft forces the compression pawls oppositely and expands the interrupted ring or shoe into engagement with the inner surface of the brake drum.

It is evident that the brake is particularly effective in either direction of drum rotation because of the fact that the actuating block is free to slide, since by this means the force of the actuating crank is utilized solely and directly for the expansion of the ring instead of being consumed in overcoming the tendency of the shoe to rotate with the drum.

Affixed to the vehicle frame 15, near the front and near the respective sides thereof, are brackets 36 which constitute pivotal supports for bell crank levers 37. The bell crank levers are adapted to swing in substantially vertical or longitudinal planes and are interconnected at their front ends by clevis hangers 38 and an equalizing bar or evener 39. This bar is connected at substantially its middle point by a turn buckle 40 to one arm 41 of a brake actuating lever 42, which is pivotally supported at 43 on a stationary bracket 44. This bracket is attached to the under side of the platform 16, as clearly shown in Fig. 2.

A brake actuating spring 45 is connected by a link 46 to the bell crank lever 42 and is adapted to set the brakes except when released.

The brakes may be positively held in a set position by an emergency brake handle 47 which is pivoted at 48 and is connected by a link 49 to another arm 50 of the bell crank lever 42. The brake is free to be set and released independently of the emergency lever on account of a slot and pin connection 51 between the rod or link and the bell crank lever.

The formation of the bell crank lever 42 is clearly brought out in the detail views of Figs. 9 and 10 and in addition to the arms already described it has a pedal projection 52 to which the platform section 18 is secured.

The arrangement of parts is such that when the pedal is pressed downwardly the brakes are released in opposition to the spring 45 which tends to set them.

If the emergency lever is set the brakes are positively held in a set position and cannot be released by the pedal. The proportioning of the levers and the arrangements of the parts is such that when the operator of the vehicle stands on the platform with one foot on the movable section 18, the brakes are released but are automatically set when the man steps off the platform or releases the pedal.

Attached to the upper arm of each of the bell crank levers 37 are equalizing levers 53 which are connected at their inner end by the chains or similar flexible members 22 to the brake actuating lever 34.

Near the rear of the vehicle are a pair of actuating levers 54 which correspond in location to the equalizing levers 53 although they have a different function. The outer ends of the levers 53 and 54 are connected in pairs on the respective sides of the vehicle by chains or cords 55. Attention is directed to the fact that these chains or cords are close to the frame and occupy an inconsiderable amount of space.

The inner ends of the levers 54 are connected by another pair of chains 22 to the brake levers 34 for the rear wheels.

The chains 22, as clearly shown in Fig. 2, extend over the guide blocks 19 which may constitute the heads of the pivot pins by which the wheel motors are connected, the grooves 20 with the flaring sections 21 serving as guides to hold the chains 22 in position and also serving to transmit the braking action irrespective of the position to which the wheels are turned for steering.

In order to prevent power being supplied to the vehicle motors when the brakes are set, I prefer to utilize an interlocking mechanism between the controller 17 and the brake actuating mechanism.

As shown in Fig. 7, the controller comprises a casing 57 in which is a central drum or actuating shaft 58. The crank arm 59 is secured to this shaft near its lower end and has a laterally extending pawl projection 60 which lies in the path of movement of a pair of scissors levers 61—61$^a$ which are pivotally mounted at spaced points 62 on opposite sides of the shaft 58 and extend diagonally therefrom overlapping as shown in Fig. 7.

The lever 61 has a lug 66 which extends laterally into the path of movement of the lever 61$^a$, the parts being so arranged that any counterclockwise movement of the lever 61 produces the corresponding clockwise movement of the lever 61$^a$.

The scissors lever 61 has a projection 63 preferably terminating in a roller 64 which is adapted to be engaged by an extension 65 of the pedal projection 52.

The arrangement of parts is such that when the pedal projection is released to permit the spring 45 to set the brakes, the extension 65 actuates the scissors levers 61 and 61ᵃ and holds the lateral projection 60 of the arm 59 against turning. Thus, it is impossible to move the controller out of the position corresponding to that shown in broken lines in Fig. 7. The arm 59 is so adjusted that the position of Fig. 7 corresponds to the off position of the controller in which power is not supplied to the motors and consequently when the brakes are set it is impossible to turn the controller to supply power to the motors.

The levers 61—61ᵃ are moved from the position shown in broken lines in Fig. 7 to the position shown in full lines when the arm 59 is moved out of its neutral position, as, for example, when power is applied to the motors.

The operation of the apparatus will be readily understood from the foregoing description but may be briefly outlined as follows:—Assuming that the brakes are released the pedal 18 being pressed downwardly into the position shown in full lines in Fig. 2, and the spring 45 put under tension; under these conditions, the bell crank lever 42 is swung in a counterclockwise direction so as to release the brakes and the projection 65 is moved so as not to interfere with the free movement of the scissors levers 61—61ᵃ.

If the attendant steps off the platform or releases the pedal, the spring 45 immediately swings the bell crank lever 42 in a clockwise direction and produces a downward pull through the turn buckle 40 and the equalizing bar 39 to the forward arms of the bell crank levers 37. The opposite arms of these levers carry the equalizing lever 53 and when actuated, serve to swing the levers 53 in a forward direction. Thus tension is at the same time put upon the chains 22 and 55, and the forward pull upon the chains 55 causes the actuating levers 54 to swing on their pivots and produce a backward pull upon the rear chains 22. The section of both sets of chains 22 corresponds and the levers 34 are correspondingly actuated.

As above outlined, when each of the levers 34 is turned it produces a rotative movement of the crank shaft 32 and turns the block 27 so as to push the pawls 31 apart. These pawls act upon the heads of the brake members or shoes which are thereby expanded and engage the cylindrical drum surfaces 25.

The resiliency of the shoes serves to quickly disengage the brake members when they are released.

Attention is directed to the fact that the brake member or shoe 26 is applied to the drum surface 25 which forms a part of the gear wheel 24. This gear wheel is one of the train of gearing 23 which completes the operative connection between the motor and the wheel. It obviously operates at a somewhat lower speed than the motor but at considerably higher speed than the wheel. Consequently, the brake is particularly effective although it is relatively small in size. Furthermore, it is particularly compact and is in position to be easily actuated. The brake application mechanism is so arranged as to not only be set automatically in case the platform is vacated by the operator, or the machine left standing, but also an emergency brake lever is provided for the purpose of positively setting the brake independently of the spring. This lever is available for use when it is desired to increase the force with which the brakes are applied, or in case the spring should break, or be disabled.

The structure illustrated may be modified in various ways within the spirit and scope of our invention, and we intend that only such limitations be imposed as are indicated in appended claims.

What we claim is:

1. The combination with a vehicle wheel, a driving motor therefor, and a train of gears connecting the motor to the wheel, of a brake drum constituting a part of one of the intermediate gears, one of the intermediate gears being formed to provide a hollow cylindrical brake drum, an expandible interrupted ring within said hollow cylindrical brake drum and adapted to coöperate, and means for expanding the ring to set the brake.

2. The combination with a vehicle wheel, a driving motor therefor, and a train of gears connecting the motor to the wheel, of a brake drum constituting a part of one of the intermediate gears, one of the intermediate gears being formed to provide a hollow cylindrical brake drum, an expandible interrupted ring within the brake drum, and rotatable means comprising a pair of pawls acting upon opposite ends of the interrupted ring for setting the brake.

3. The combination with a vehicle having an axle bar, and a motor-driven wheel, a pivot pin connecting said axle bar to the wheel, of a brake forming a part of the pivotal members, and a flexible brake actuating member, said pivot pin being formed to guide the flexible brake actuating member, substantially in the pivotal axis of the wheel.

4. The combination with a vehicle having an axle bar, a motor-driven wheel, a pivot pin connecting said axle bar to the wheel, a brake forming a part of the pivotal members and having an actuating lever, and a flexible brake actuating member connected to the lever, said pivot pin having a head slotted to receive and form a guide for the flexible brake actuating member substantially in the pivotal axis of the wheel.

5. The combination with a vehicle having a plurality of wheels pivoted for steering, a brake for each wheel, brake drums and co-operating brake members for each wheel, a plurality of flexible brake application members, and means for guiding the flexible brake application members substantially at the pivotal axis of the wheel; and an equalizer for interconnecting the flexible members.

6. The combination with a vehicle having a plurality of wheels pivoted for steering, a brake for each wheel, brake drums and co-operating brake members for each wheel, a plurality of flexible brake application members, and means for guiding the flexible brake application members substantially at the pivotal axis of the wheel, an equalizing lever connected to a pair of said flexible brake application members; and an actuating lever connected to the equalizing lever.

7. The combination with a vehicle having four steered wheels mounted to turn about independent vertical pivots, a brake for each wheel, a guide block substantially in the axis of each pivot, a flexible brake actuating member extending from the respective brakes over the several guide blocks, an actuating lever on the respective sides of the vehicle near one end, an equalizing lever pivotally mounted on each actuating lever, and means for connecting the respective ends of each equalizing lever to the flexible members for the wheels on the same side of the vehicle.

8. The combination with a vehicle having four steered wheels mounted to turn about independent vertical pivots, a brake for each wheel, a guide block substantially in the axis of each pivot, a flexible brake actuating member extending from the respective brakes over the several guide blocks, an actuating lever on the respective sides of the vehicle near one end, an equalizing lever pivotally mounted on each actuating lever, means for connecting the respective ends of each equalizing lever to the flexible members for the wheels on the same side of the vehicle, a transverse equalizing bar connecting actuating levers, and means for applying the brakes connected to the intermediate point in the transverse bar.

9. The combination with a vehicle having four steered wheels mounted to turn about independent vertical pivots, a brake for each wheel, a guide block substantially in the axis of each pivot, a flexible brake actuating member extending from the respective brakes over the several guide blocks, an actuating lever on the respective sides of the vehicle near one end, an equalizing lever pivotally mounted on each actuating lever, means for connecting the respective ends of each equalizing lever to the flexible members for the wheels on the same side of the vehicle, a transverse equalizing bar connecting actuating levers, and a spring connected to the transverse bar for applying the brakes simultaneously.

10. The combination with a vehicle having four steered wheels mounted to turn about independent vertical pivots, a brake for each wheel, a guide block substantially in the axis of each pivot, a flexible brake actuating member extending from the respective brakes over the several guide blocks, an actuating lever on the respective sides of the vehicle near one end, an equalizing lever pivotally mounted on each actuating lever, means for connecting the respective ends of each equalizing lever to the flexible members for the wheels on the same side of the vehicle, a transverse equalizing bar connecting actuating levers, a spring connected to the transverse bar for applying the brakes simultaneously, and means for opposing the spring to release the brakes.

11. A brake mechanism comprising a brake, a bell crank lever, a spring connected to the bell crank lever for applying the brake, means for opposing the action of the spring to release the brake and non-yielding means for applying the brake.

12. A vehicle brake comprising a plurality of brake members, equalizing connections between the brakes, a spring for simultaneously applying all of the brakes, means for opposing the action of the spring to release the brakes and non-yielding means for applying the brakes.

13. A brake mechanism comprising a brake, a bell crank lever, a spring connected to the bell crank lever for applying the brake, means for opposing the action of the spring to release the brake, and an emergency lever for acting with the spring for applying additional force to the brakes.

14. In a vehicle, the combination with a controller adapted to supply power to the vehicle, brakes, a spring for applying the brakes, means for opposing the spring to release the brakes, means dependent upon the setting of the brakes for throwing the controller to its off position and locking it in such position and non-yielding means for applying the brakes.

15. In a vehicle, the combination with a controller adapted to supply power to the vehicle, brakes, a spring for applying the brakes, means for opposing the spring to release the brakes, a pair of overlapping levers, a lateral projection on one lever extending into the path of the other to cause the levers to move together in one direction, an eccentric lug constituting a part of the controller and extending between the ends of the overlapping levers, one of said levers being operatively connected to the brake mechanism.

16. In a vehicle, the combination with a controller adapted to supply power to the vehicle, brakes, a spring for applying the brakes, means for opposing the spring to release the brakes, a pair of overlapping levers, a lateral projection on one lever extending into the path of the other to cause the levers to move together in one direction, an eccentric lug constituting a part of the controller and extending between the ends of the overlapping levers, a lug extending outwardly from one of said levers, and a pawl projection on said brake actuating mechanism for actuating the lever to throw the controller to its off position when the brakes are set.

17. A brake comprising an expandible ring, a rotatable actuator, a block transversely slidable with reference to the actuator and guided thereby, and a pair of pawls connecting the slidable block to the ends of the ring and adapted to expand the ring when the rotatable member is turned.

18. A brake comprising an expandible ring, a rotatable actuator having a transverse slot, a block slidably mounted in the slot, and a pair of pawls connecting the block to the ends of the ring and adapted to expand the ring when the rotatable member is turned.

19. A brake comprising an expandible ring, a rotatable actuator having a transverse slot, a block slidably mounted in the slot, and a pair of removable and interchangeable pawls connecting the block to the ends of the ring and adapted to expand the ring when the rotatable member is turned.

20. A brake comprising a hollow cylindrical drum, an expandible interrupted ring within the drum, a rotatable actuating member between the ends of the interrupted ring, a block slidable relative to the rotatable actuating member having sockets and removable pawls pivotally connected to the block in the sockets, said pawls extending oppositely from the rotating member into engagement with the respective heads or enlargements of the interrupted ring, whereby the turning of the rotatable member expands the ring.

21. A cylindrical brake drum, an expanding and floating interrupted ring therein, a relatively stationary rotatable actuating shaft adjacent to the ring, a block slidably mounted relative to the rotatable shaft, and means between the block and the respective ends of the ring for expanding the ring, whereby the brake is effective for either direction of drum rotation.

22. A cylindrical brake drum, an expanding, interrupted and floating ring therein, a rotatable actuating shaft extending between the ends of the floating ring, a block slidably mounted in a transverse slot in the shaft, and links between the block and the respective ends of the ring.

23. A cylindrical brake drum, an expanding, interrupted and floating ring therein, a rotatable actuating shaft extending between the ends of the floating ring, a block slidably mounted in a transverse slot in the shaft, and compression links between the block and the respective ends of the ring adapted to expand the ring in response to a rotative movement of the shaft.

24. A cylindrical brake drum, an expanding, interrupted and floating ring therein, a rotatable actuating shaft extending between the ends of the floating ring, a block slidably mounted in a transverse slot in the shaft, and compression links between the block and the respective ends of the ring adapted to expand the ring in response to a rotative movement of the shaft, the shaft constituting an abutment for one end of the ring depending upon the direction of drum rotation and the block being adapted to slide to permit a limited rotative movement of the ring, with the drum as it is expanded into engagement therewith.

25. A brake comprising a rotatable member having a braking surface, an expandible ring sector coöperating therewith, a relatively stationary actuator extending between the ends of the expandible ring sector, and means dependent upon the actuator and upon the direction of rotation of the rotatable member of the brake for selectively forcing one end of the ring against the brake surface, the reaction of the opposite end being taken by the actuator independently of said means.

26. A brake comprising a rotatable member having a braking surface, an expandible ring coöperating therewith, an actuator, and means adapted to selectively exert pressure on the respective ends of the ring dependent upon the direction of rotation of said rotatable member, the reaction of the expandible ring being taken by the actuator independently of said means.

27. A brake comprising a rotatable member having a braking surface, an expandible braking member coöperating therewith, a relatively fixed stop for limiting the movement of the braking member with the rotatable member in either direction, and means slidably mounted in the relatively fixed stop to apply the braking member.

28. A brake comprising a rotatable member having a braking surface, an expandible ring sector, a relatively fixed rotatable anchorage between the ends of the ring sector adapted to limit the rotative movement of the expandible ring sector, with the rotatable anchorage in either direction, and actuating means slidably mounted in the rotatable anchorage.

29. A brake comprising a wheel having an internal braking surface, an expandible ring sector, a relatively fixed rotatable shaft extending between the ends of the ring sector and an actuator comprising a sliding block extending through a recess in the rotatable shaft and depending upon the rotation thereof for expanding the ring sector.

30. A brake drum, an expandible interrupted ring within the drum, rotatable means between the ends of the ring for setting the brake and a member slidable across the axis of said means arranged to push the ends of the ring apart.

31. A cylindrical brake drum, an expanding and floating interrupted ring therein, a relatively stationary rotatable actuating shaft adjacent to the ring, and a block slidably mounted relative to the rotatable shaft arranged to expand the ring, whereby the brake is effective for either direction of drum rotation.

In witness whereof, we have hereunto set our hands this 24th day of August, 1916.

WILLARD C. BRINTON.
WALTER J. DUDLEY.